United States Patent [19]
Cerveny

[11] 3,829,774
[45] Aug. 13, 1974

[54] MICROPOWER AUTOPOLARITY VOLTMETER

[75] Inventor: Walter J. Cerveny, Lima, Ohio

[73] Assignee: Triplett Corporation, Bluffton, Ohio

[22] Filed: May 30, 1972

[21] Appl. No.: 257,683

Related U.S. Application Data

[63] Continuation-in-part of Ser. No. 70,369, Sept. 8, 1970, Pat. No. 3,746,984.

[52] U.S. Cl.................. 324/115, 324/119, 324/133
[51] Int. Cl....................... G01r 15/08, G01r 19/14
[58] Field of Search.................... 324/119, 115, 133

[56] References Cited
OTHER PUBLICATIONS

Electronics Buyers' Guide; page 497; June 1958.
Sensitive DC-VTVM Type MV-27C; Millivac Inst. Corp., Schenectady, N.Y.; Nov. 8, 1956.

Primary Examiner—Alfred E. Smith
Assistant Examiner—Ernest F. Karlsen
Attorney, Agent, or Firm—John H. Mulholland

[57] ABSTRACT

A highly sensitive circuit for an electrical instrument for causing the indicator on a meter to read linearly upscale for positive or negative DC signals, AC signals, or a combination of AC or DC signals applied to the input of the circuit. The circuit may also operate in a micropower mode with sufficiently low current drain to permit the instrument to operate continuously for a time nearly equal to the shelf life of the battery power source. In a first embodiment, the input signal to be measured is provided to an input circuit which includes a resistive divider network in circuit with a null control circuit for selecting the range of input signals. A selected proportion of the input signal is applied to the input of a field effect transistor (FET). The output from the FET is applied to the input of an amplifying transistor having its output in circuit with a bridge network. The bridge network includes a pair of oppositely poled diodes in circuit with fixed resistors so that a first diode conducts for positive signals and a second diode conducts for negative signals from the transistor. A meter is connected in circuit with the diodes and is arranged so that the indicator on a meter reads upscale whether the output of the amplifier comprises positive or negative DC signals or AC signals or a combination of both. A feedback circuit includes a resistive network in circuit with the bridge for selecting the appropriate circuit sensitivity for the function to be performed by the circuit. The output from the resistive network in the feedback path is connected to a pair of transistors connected in a Darlington configuration, the output of which is connected to the FET. The input circuit also includes a switching circuit for providing a coupling capacitor in series circuit with the input signals to block DC when AC signals are being measured, then to provide a low pass filter in circuit with the input signals when DC signals are being measured. The circuit according to the invention may be also used to measure resistance and current. In the micropower power mode, the FET and the amplifying transistor are each operated in a starved mode. The starved pair of transistors are coupled to the diode bridge network through a complementary emitter follower amplifier to drive the bridge circuit. An alternate bridge circuit comprises switches in circuit with each of the diodes in a 4-diode bridge so that when these switches open, the circuit will operate in the autopolarity mode. The closure of respective pairs of switches will cause the instrument to operate in either the positive or negative mode. In one embodiment for measuring resistance, a low power "ohms" measurement is provided by substituting a low current regulator power source for the normal battery in the probe circuit. In addition, the gain of the amplifier stages is increased. The resulting circuit enables in-circuit resistance measurements in which the voltage applied to the circuit to be tested is sufficiently low that unwanted biasing of semiconductive junctions in the test circuit is avoided.

The method of using the circuit of the invention is also disclosed wherein the indicator on the meter is caused to indicate a null reading in the absence of an input signal to the circuit by adjusting the null control circuit and sensing the indicator on the meter until a null is reached. The null control circuit may also be used to provide a storage feature for the circuit.

23 Claims, 3 Drawing Figures

3,829,774

MICROPOWER AUTOPOLARITY VOLTMETER

CROSS-REFERENCE TO A RELATED APPLICATION

This application is a continuation-in-part of the copending application of the same inventor Ser. No. 70,369, filed Sept. 8, 1970, now U.S. Pat. No. 3,746,984, issued July 17, 1973.

BACKGROUND OF THE INVENTION

This invention relates to a circuit for an electrical instrument in which the indicator on a meter reads upscale for positive or negative DC input signals, AC input signals or a combination of both. More particularly, this invention relates to a circuit for use in a multimeter which is capable of measuring positive or negative DC signals, AC signals, and other circuit parameters with a common circuit. Still more particularly, this invention relates to a method of using the circuit according to the invention in which the indicator for the meter of the circuit is caused to provide a null or a minimum indication rather than an apparent zero setting and wherein this feature may also be used to provide a signal storage capability for the meter. Still more particularly, this invention relates to such a circuit capable of operating in a micropower mode so that the instrument may be continuously operated for a period nearly equal to the shelf life of the batteries which provide the source of power to the circuit. In addition, this invention relates to a resistance measuring device in which a low voltage source may be substituted for the normal voltage source applied to the probe so that in-circuit measurements of resistance can be made without undesirably biasing the semiconductor junctions within the test circuit.

In the electrical arts, the need for producing an instrument which provides a measuring device for a number of circuit parameters, such as AC voltage, DC voltage, AC current, DC current, resistance and the like has long been known. The prior art has thus provided a number of circuits which provide the capability of measuring most or all of these parameters in a single instrument. Conventional multimeters, however, generally require that great care be used and specific attention be given to the polarity of the signal being measured. In using such conventional instruments, the application of the input leads of the multimeter to the test point in the circuit at the wrong polarity causes the meter to read offscale in a reverse direction and requires that the input leads be reversed to correct for their erroneous application to the test point. Such manipulations are extremely time consuming, especially in troubleshooting a complex circuit, and are annoying to the person using the instrument.

Accordingly, it is an aim of the invention to provide a multimeter in which the indicator on the meter reads upscale regardless of the polarity of the test point to which the input leads for the meter are attached. Such a circuit thus eliminates the need to switch leads during troubleshooting in the event that the input leads for the instrument are connected to the test point in a reverse manner. Such a feature also has a particular advantage when troubleshooting in confined or crowded quarters where the test point may be difficult to reach. In addition, such a feature saves the user valuable time in testing the circuit.

It is also desired in the development of multimeters to minimize the number of circuit components for use with the instrument so that such instrument may be small, lightweight, and simple to manipulate. Thus, it is an additional aim of this invention to provide an autopolarity voltmeter circuit in which the same amplifier circuit may be used for all of the functions of the voltmeter, including the measurement of both AC voltage, DC voltage, current and other parameters as well. Such common circuitry results in a lower cost for the instrument and has substantial advantages in decreasing circuit complexity.

In addition, in the development of such voltmeters, it is desired that a number of specific features be provided so that the instrument provides an accurate indication of the input signal to be measured. For example, it is generally desired that the input impedance for the circuit of the instrument be quite high for instrument accuracy. Moreover, it is desired that the amplifier circuit of the instrument incorporate a high degree of feedback so that the tracking of the input signal by the indicator on the meter is linear over the scale selected. It is also desired to minimize the number of scales used on the instrument for its current and voltage ranges, while yet preserving the accuracy of the instrument over a wide range. The use of a minimum number of selectable scales consistent with the accuracy requirements for the instrument provides another time-saving capability to the instrument for the user.

In addition, it is known that the resistance of the metal, generally copper, used in the moving coil of the meter changes with temperature. Thus, it is desired in developing meters of the type described to compensate automatically, preferably through the use of a feedback circuit, for changes in the impedance of the metal in the meter. When so compensated, the instrument may be used over a wide temperature range without the loss of accuracy and this feature provides another significant capability for the instrument.

The prior art has also produced a number of meters which use various techniques for adjusting the zero setting for the indicator on the meter. Such techniques often include the laborious and time-consuming feature of adjusting a variable resistor in circuit with the meter until a precise zero setting on the meter is obtained. In such instruments, that setting is essential for an accurate indication of the signals being measured by the meter over the instrument range. In general, care must be taken in making such adjustments to avoid parallax of the pointer with respect to the scale on the meter face to avoid inaccuracy of the output reading on the meter. Thus, it is desired to provide a meter which provides an accurate indication of the input signal without the need for adjusting the instrument precisely to zero, but rather to some other easily observable point, such as a minimum deflection of the indicator on the meter over a range of adjustments, or for a null reading. If an operator were able to adjust for a null, for example, substantial time savings would be achieved in the use of a meter.

It is also a problem in the development of multimeters to provide a memory or storage capability for the instrument. For example, it is sometimes convenient to sense a circuit parameter and to observe the magnitude of the sensed parameter at a later time without having had to record the indication or trust to memory recall.

By further example, there are a number of situations in which repetitive samplings of a circuit parameter, such as the voltage across a battery, are made. In making such measurements, it is an advantage to the operator to be able to read the variance of the parameter from an optimum level directly, without the need for mentally observing the output on the meter, and subtracting the observed output from a known optimum output. Thus, it is an additional aim of the invention to provide a multimeter which will directly read the variance of the circuit parameter from an optimum level. In addition, it is thus an advantage of such an instrument to be able to retain the indication of the observed signal on the instrument after the input probe for the meter had been removed from the signal. Thus, it is an additional aim of this invention to provide a circuit which has a storage feature in which the indication on the meter of the instrument is adjusted for a predetermined setting and wherein the circuit operates so that when the probe is removed from the parameter, the indicator will return to the original reading observed and maintain that reading for later reference by the operator.

It is a continuing object in the art of producing multimeters to make such instruments solid state instruments which operate with the use of batteries to avoid the need for circuit connections to external power sources. It is an additional object in the development of such meters to provide a low current drain from the battery power sources so that the instrument has a long life without the need for maintenance or replacement of the storage batteries. Accordingly, it is an additional aim in such instruments to minimize the battery drain to avoid problems of maintenance and deterioration in the accuracy of the instrument with age.

In making a measurement of the resistance element mounted in a test circuit, the instrument must pass a current through the element to be tested. In solid state circuits, the voltage produced by the test instrument itself was often sufficient to bias or turn on semiconductor junctions in the circuit under test, thus degrading the accuracy of the resistance measurement. Accordingly, one of the specific aims of this invention is to provide the capability of substituting a low power source for the normal power source used in making resistance measurements, whereby the voltage applied to the circuit under test is below the value normally sufficient to bias semiconductor junctions.

These and additional aims and objects of the invention will become apparent from a review of the written description of the invention taken in conjunction with the accompanying drawing.

BRIEF SUMMARY OF THE INVENTION

Directed to overcoming the shortcomings of the prior art and achieving the aims and objects aforestated, the circuit according to the invention includes a probe which is capable of connection to a test point for providing a source of input signals to the circuit. Input circuit means are provided for receiving the input signal from the probe and applying an input signal representative thereof to the gate of a field effect transistor (FET). The input circuit includes a divider network comprising a plurality of selectable resistors for accommodating a wide range of input signals applied to the FET. A filter circuit, including a switch, selectively provides a coupling and DC blocking capacitor in circuit with the input circuit when the instrument is used to indicate an AC signal or to provide a low pass filter in circuit with DC signals to eliminate AC components in the signal. The resistive divider is connected in circuit with a zero null control circuit for adjusting an indicator on the output meter for a null or a minimum setting. The divider and zero null control circuit are so arranged that a minimum reading occurs when a predetermined point on the resistive bridge is adjusted to a zero voltage. A signal limiting diode is connected in circuit with the gate of the FET to avoid damaging the circuit.

In one embodiment, the output of the FET is connected in circuit with a transistor amplifier having its output in circuit with a bridge network which includes the output meter. The bridge network comprises a pair of oppositely poled diodes, each of which is in circuit with a resistor. A variable resistor is connected in circuit with these resistors so that each leg of the bridge comprises a diode in circuit with a resistor and a selected portion of the variable resistor. The output meter is connected between the cathode of a first diode and the anode of a second diode. The anode of the first diode and the cathode of the second diode are connected to a common terminal in circuit with the output of the transistor. The circuit thus operates so that if a positive signal is applied to the diode bridge, the first diode conducts while if the applied voltage is negative, the second diode conducts. In this manner, the current flow through the meter is unidirectional regardless of the polarity of the signal applied to the input of the meter.

A feedback circuit comprises a selective function resistor in circuit with a pair of transistors connected in a Darlington configuration which are, in turn, connected to the source element of the FET. By such a feedback connection, the closed loop gain is maintained at a low value while the open loop gain is maintained at a high value resulting in high gain stability and linearity in the circuit. The feedback circuit also significantly increases the input resistance of the FET, while effectively ignoring changes in the function resistance.

The method of using such a circuit includes the step of adjusting the zero setting of the circuit according to the invention by adjusting the zero null control circuit. The zero null control is set so that the meter indication achieves a null, rather than necessarily an absolute zero setting, in the absence of an input signal to the circuit. The method of using the circuit also includes the step of storing the magnitude of an output signal produced in response to an input signal to the circuit by adjusting the zero null control.

In another embodiment, the output of the FET is connected to a transistor amplifier having its output in circuit with a complementary emitter follower pair. The common output of the emitter follower pair is connected by way of a bridge network in a feedback loop to the FET. Low current drain is made possible by operating the FET and transistor amplifier in a starved mode. The emitter follower pair is operated in its quiescent state at zero current drain which prevents loading of the transistor amplifier by the bridge and feedback network. When the circuit is balanced with the zero adjustment control and no input signal is applied, the transistors in the emitter follower pair are nonconducting. Thus, no current is drawn by the bridge and feedback network. The only current flow in the instrument is through the FET and transistor amplifier stage which are operated in the starved mode so that current drain is minimized. Accordingly, the instrument draws appreciable current only during measurement. It has been found that the life of the batteries used in connection with this embodiment would be equivalent to shelf life even if the instrument was left on continuously for several years.

In connection with the aforementioned embodiment, the efficiency of the bridge network is increased by using a 4-diode bridge instead of a 2-diode bridge. The bridge may be represented as a diamond-shaped circuit with suitably poled diodes in the respective sides of the diamond. The meter is connected across two opposite vertices of the diamond such that positive and negative signals applied to the bridge network cause deflection of the pointer of the meter in the same direction. Respective switch means are connected across each diode in the bridge. An indication of the polarity of the signal applied to the bridge can be obtained by closing one or the other pair of the switch means.

In another embodiment, the micropower amplifier circuit and bridge and feedback network of the aforementioned embodiments are used in connection with a pair of interchangeable power sources for making resistance measurements. To avoid spurious biasing of semiconductor junctions in the circuit under test, a low current regulator power source may be substituted for the normal voltage source applied across the probes for resistance measurements. In addition, a resistance switching means is included in circuit with the feedback loop between the FET and the bridge network so that the micropower amplifier can be provided with increased gain when the low current regulator power source is in use. In a specific embodiment of this type, a normal 1½ volt battery is replaced with a 70 millivolt source, low enough to prevent biasing of semiconductor junctions in the circuit under test.

DETAILED DESCRIPTION OF THE PREFERRED EMBODIMENTS

Figure 1:
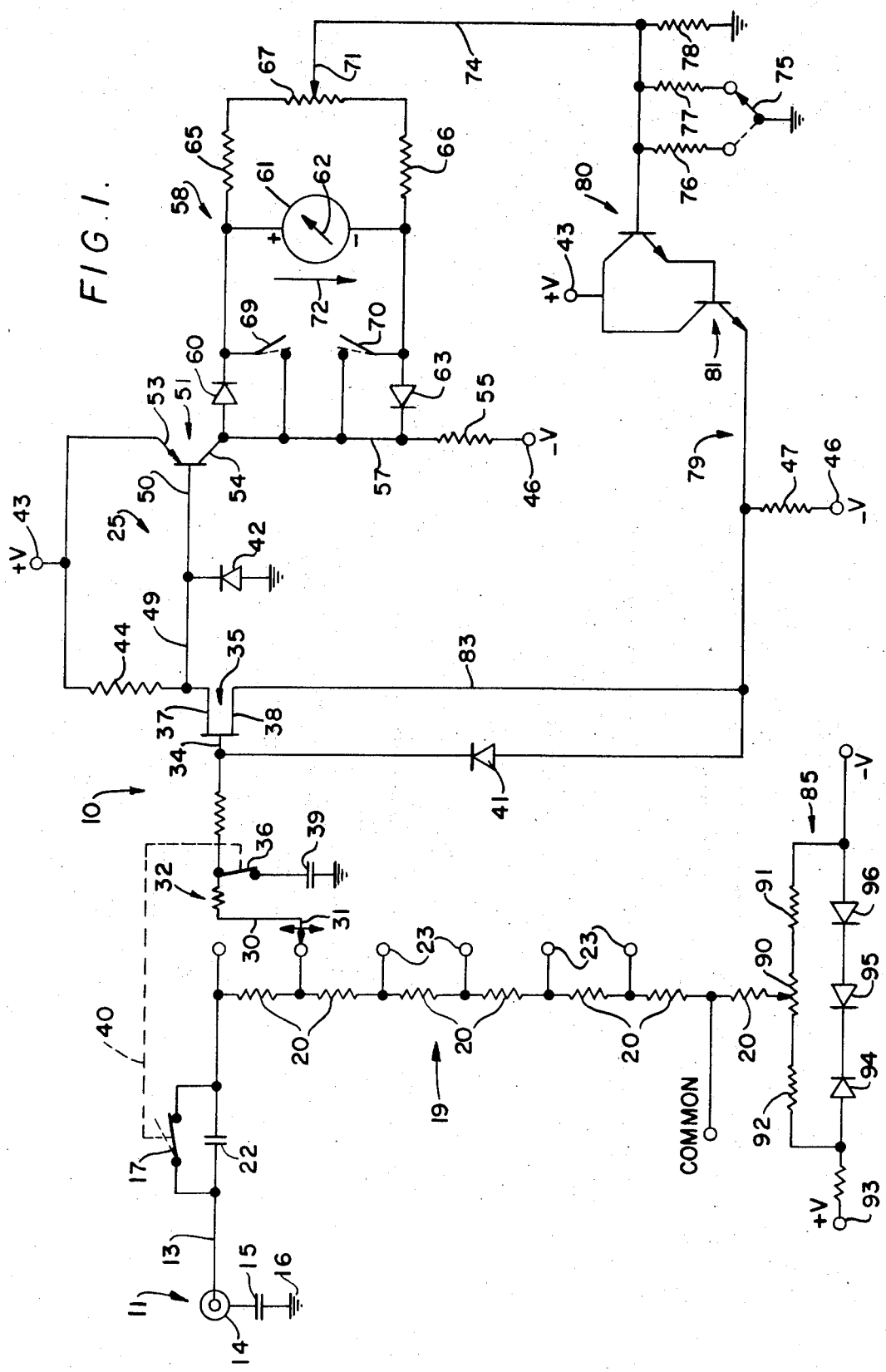
FIG. 1 is a detailed circuit diagram, partially in block form, illustrating the circuit of one embodiment according to the invention.

The multimeter circuit according to one embodiment of the invention is designated generally by the reference numeral 10 and includes a probe 11 which is capable of being connected to a test point in a circuit for providing a source of input signals on lead 13. The probe 11 has its external jack 14 connected by a capacitor 15 to a source of reference potential 16, for example, ground. Throughout this specification, the terms "source of reference potential," "ground," or "common" are used interchangeably.

The signals on lead 13 are connected through a switch 17 to a resistive divider network designated generally by the reference numeral 19, which comprises a plurality of resistors 20. A capacitor 22 is connected in parallel to the switch 17. As shown, the switch 17 is connected so that the circuit may receive either AC or DC signals. If the switch 17 is opened, the capacitor 22 is inserted in circuit with the signals on lead 13 and acts as a blocking capacitor to remove DC components from the AC signals. Physically, the manipulative portion of the switch 17 is located on the face of the meter and is marked with indicia for the convenience of the operator.

The resistive divider network 19 provides a range selection for the circuit so that the input signals may be connected with any one of a plurality of taps 23 to provide the source of input signals to the amplifier circuit designated generally by the reference numeral 25.

The input signals from the selected tap 23 on the resistive divider network 19 are provided on lead 30 to the switch 31. When in the position shown, the circuit is designed to receive DC signals through a resistor 32 which is connected to the gate 34 of a field effect transistor 35. The field effect transistor includes a drain electrode 37 and a source electrode 38.

When DC signals are provided on lead 13 and switch 17 is closed, as previously described, a switch 36 is also closed and the signals are applied directly to the resistor 32 and to the gate electrode 34 of the FET 35. Preferably, the switch 17 and the switch 36 are ganged for simultaneous operation as shown by the dotted line 40. In this case, the capacitor 39 acts in conjunction with the resistor 32 as a filter to remove any AC signals that may be superimposed on the DC voltage being measured.

On the other hand, when AC signals are provided on lead 13, the switches 17 and 36 are opened. Thus, the capacitor 22 acts as a coupling capacitor for the AC signals and a blocking capacitor to the DC components of the AC signals when the switch 17 is open. When desired, a combination of DC and AC signals may be measured by maintaining switches 17 and 36 in the position shown.

A diode 41 has its cathode connected to the gate 34 of the field effect transistor 35 and together with the resistor 32 provides an overload protection to the input of the FET 35. Similarly, a diode 42 in circuit with the drain 37 of the FET and with the base 50 of the transistor 51 acts as a current limiter for the circuit.

A source of positive biasing potential 43 is connected to the drain 37 of the input field effect transistor through a biasing resistor 44. The source 38 of the FET 35 is connected to a negative source of biasing potential 46 through a resistor 47. The output from a field effect transistor 35 is connected by way of lead 49 to the base 50 of an amplifying transistor 51. The emitter 53 of the transistor 51 is directly connected to the source of biasing potential 43, while its collector is connected through a biasing resistor 55 to the source of negative potential 46. Thus, the voltage applied to the gate 34 of the field effect transistor 35 is amplified both by the field effect transistor 35 and by the PNP transistor 51.

The output from the collector 54 of the transistor 51 is provided to a bridge network 58. The bridge 58 comprises a first diode 60 having its anode connected to the collector 54 of the transistor 51 and to lead 57 and its cathode connected to the positive terminal of a meter 61. A second diode 63 has its cathode connected to the lead 57 and its anode connected to the negative terminal of the meter 61. The cathode of the diode 60 is also connected to a fixed resistor 65, while the anode of the diode 63 is connected to a fixed resistor 66. The opposite ends of the resistors 65 and 66 are connected to a variable resistor 67 which is adjustable to achieve a DC balance, and to bias the meter 61 for accuracy.

A switch 69 is connected in parallel with the diode 60 while a switch 70 is connected in parallel with the diode 63. The switches 69 and 70 are provided so that, when either switch is closed, the circuit may operate to measure positive or negative DC signals, respectively, in a conventional manner. In operation, however, with the switches 69 and 70 as shown, positive signals from the collector 54 of the transistor 51 on lead 57 will cause diode 60 to conduct to provide a current flow from plus to minus through the meter 61 in the direction designated by the arrow 72. When negative signals appear on lead 57 from the collector 54 of transistor 51, the diode 63 is caused to conduct and current flow is again in the direction designated by the arrow 72. Thus, there is a unidirectional current flow through the meter 61 regardless of the polarity of the applied signal.

The meter 61 has an indicator, or pointer 62, for providing a physical representation of the magnitude of the signal applied to the meter. Similarly, when AC signals appear on lead 57, diodes 60 and 63 conduct on alternate positive and negative half cycles in the manner previously described so that the current flow on alternative positive and negative half cycles through the meter 61 is likewise in the same direction.

The switches 69 and 70 also provide a capability for the circuit to indicate what polarity is being measured. If a positive signal is applied to the bridge 58 and provides an upscale reading on the meter 61 and the positive measuring switch 69 is depressed, the meter reading remains the same since the diode 60 had previously been conducting in response to the positive signals. If, on the other hand, the switch 70 is depressed while positive signals are applied to the bridge 58, the meter indication falls to below zero since the diode 63 had not previously been conducting. Thus, in effect, the potential across a diagonal of the bridge 58 is determined by the voltage drop across the diode 60 when switch 70 is closed for positive signals appearing on lead 57.

On the other hand, if a negative potential is applied to the bridge 58, the diode 63 is conducting and the depression of the negative polarity determining switch 70 causes no change in the output reading on the meter 61. Under those conditions, the diode 60 is nonconductive so that the depression of the switch 69 will cause the meter to read below scale as determined by the voltage differences across the meter, i.e., the voltage drop across the diode 63.

The signal across the meter 61 under either condition is also applied across the series combinations of resistors 65, 66, and 67. Since the resistor 67 is adjustable, the proportion of the signal provided on either leg of the bridge may be selected in accordance with the desired balance of the circuit. The variable tap 71 of the potentiometer 67 is applied on lead 74 to a function switch designated generally at 75. The function switch comprises a plurality of resistors, three representative resistors being shown as designated by numerals 76, 77, and 78 to provide a variable quantity of resistance in shunt with the feedback network designated generally at 79 to the circuit. The function switch is physically operated when the function of the multimeter is selected. Thus, for accuracy, a different amount of resistance may have to be inserted in the feedback path for the measurement of resistance than, for example, for the measurement of current by the meter.

The feedback network 79 comprises a pair of transistors 80 and 81 connected in a Darlington configuration, i.e., the emitter of the transistor 80 is connected to the base of the transistor 81 while their collectors are respectively connected to the source of biasing potential 43. The emitter of the transistor 81 is connected to the biasing resistor 47 and thus to the source 38 of the FET 35 by way of lead 83.

A proportion of the signal which appears on lead 74 is fed back to the Darlington pair of transistors 80 and 81 to the source element 38 of the transistor 35. The amount of signal fed back is determined by the resistance ratio of the bridge resistor 67 and the function resistor 75, respectively. In a preferred embodiment, a typical value of the closed loop gain of the circuit was about 4, whereas the open loop gain was at about 400, thus affording a feedback of greater than 100 to 1 which thus resulted in good gain stability and linearity in the meter output. The use of the feedback network 79 also increases the input resistance of the FET since the feedback signal is in phase with the input signal so that in effect, the source element is bootstrapped.

The high current gain of the Darlington pair of transistors 80 and 81 produces a very low drive impedance to the source element of the FET 35. Thus, changing the function resistance value of the function switch 75 has little effect on the reflected impedance of the Darlington pair since the gain of the circuit is high and therefore the impedance is relatively low. Thus, with a low source impedance, the gain of the field effect transistor 35 will be high for all values of the function resistors 76, 77 or 78.

A significant advantage to the circuit is provided by use of the zero null control circuit 85 in circuit with the resistive divider network 19. When no input signals are applied to the circuit, the indicator on the meter 61 can be set to zero by adjusting the zero null control 85. While in a conventional multimeter, the adjustment is set so that the meter achieves a true zero setting, the adjustment of the zero null control 85 according to the invention permits the adjustment of the circuit so that the meter achieves a null or a minimum rather than a true zero. The minimum reading occurs when the top of the resistive bridge, i.e., signal on lead 57, is adjusted to a zero voltage.

The null control circuit 85 includes a source 93 of reference potential, i.e., a battery 93. A plurality of diodes 94, 95, and 96, for regulating the battery potential, are connected in series with each other, and the series combination of diodes is connected in parallel with the battery 93.

A variable resistor 90 has its wiper connected to one of the resistors 20 in the resistive network 19. Resistors 91 and 92 are respectively connected to the opposite ends of the variable resistor 90, and the series combination of resistors 90, 91, and 92 are connected in parallel with the battery 93.

Adjustment of the variable resistor 90 permits the signal level applied to the lowermost resistor 20 of the network 19 to be varied, thus effectively controlling the shunting action of the network 19 on the input signal applied to the gate of the FET 35. Accordingly, the positioning of the indicator 62 on the meter 61 may be controlled by this technique.

The parameters of the circuit are selected so that the indicator 62 on the meter 61 achieves a null reading when a predetermined signal, for example, zero volts, is applied to a predetermined point, i.e., the lead 57 in the bridge network 58. In a preferred embodiment, when no input signal is applied to the circuit on lead 13, the signal level at lead 57 is set by the adjustment of the resistor 90 to zero volts by adjusting the resistor 90 until the indicator 62 on the meter 61 achieves a null indication. The capability of the circuit to be adjusted to a zero setting by adjusting to the null indication on the meter is a significant time-saving feature of the circuit.

The adjustment of the null control circuit 85 when an input signal is applied to the circuit on lead 13 provides a storage capability for the circuit. By way of example, a signal applied to lead 13 from the probe 11 will cause the indicator 62 on the meter 61 to achieve a certain setting which indicates the magnitude of the signal. While the signal continues to be applied, the variable resistor 90 in the null control circuit 85 is adjusted until the indicator 62 is caused to achieve a zero or a null setting. Thereafter, when the input signal on lead 13 is removed, the indicator will return to the position which it had attained when the signal was previously applied. In this manner, the magnitude of the signal is effectively stored by the meter for later use by the operator.

One manner in which the stored signal may be effectively used by the operator is during the repetitive sensing of signals, for example, the voltage on DC batteries. When a subsequent signal is applied to the circuit, the indicator 62 will indicate the difference between the stored signal, i.e., the signal sensed when the prior signal was sensed, and the subsequent signal. In this manner, the circuit may be used to indicate directly the difference between an applied signal and a predetermined signal.

If desired, the predetermined level may be set by the operator to a determined value by an adjustment of the variable potentiometer 90 without applying an input signal to lead 13. In this manner, the difference between the subsequently applied signal and an optimum level is immediately indicated by the meter.

Figure 2:
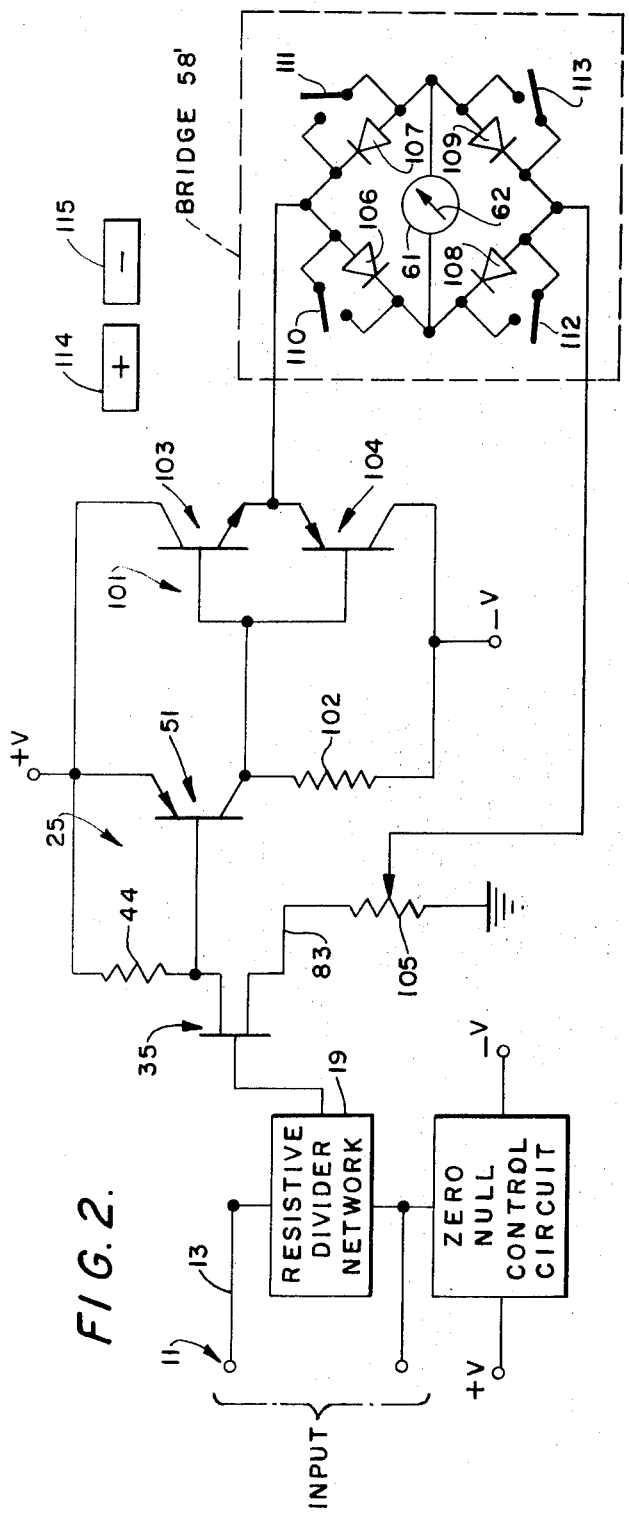
FIG. 2 is a circuit diagram, partially in block form, illustrating the circuit of another embodiment according to the invention operating in the micropower mode and having an alternate configuration of the bridge network.

Another embodiment of the invention referred to as the micropower autopolarity circuit is shown in simplified schematic form in FIG. 2. The circuit elements common to the embodiments of both FIGS. 1 and 2 are identified by the same reference numerals. While adopting the same general circuit configuration as the embodiment of FIG. 1, the autopolarity circuit in FIG. 2 adds a complementary emitter follower pair 101 between the bridge and feedback network and the PNP transistor amplifier 51. The collector of the transistor 51 is connected via a resistor 102 to a source of negative potential. The emitter follower pair 101 comprises an NPN transistor 103 and a PNP transistor 104 having their bases connected in common to the collector of the transistor 51. The collector of the transistor 103 is connected to a source of positive potential and the collector of the transistor 104 is connected to a source of negative potential. The emitters of the transistors 103 and 104 are connected in common to the bridge and feedback network. The complementary emitter follower pair 101 is non-conducting when no signal is applied to the input via the probe 11. Thus, the emitter follower pair 101 and the bridge network draw no current in the absence of an applied input signal. The FET 35 and the transistor amplifier 51 are operated in a starved mode and the emitter follower pair is operated in its quiescent state at zero current drain. For example, the FET 35 typically draws about 2 microamps and the transistor amplifier 51 about 8 microamps. Normally, the starved amplifiers comprising FET 35 and the transistor 51 would not be considered suitable for driving a diode meter bridge because of the large value load or collector resistors normally associated with such amplifiers. However, by coupling a starved amplifier to a diode meter bridge via a complementary emitter follower, the drive capability may be improved up to 100 times. When the circuit is balanced with the zero null control circuit, and the meter in the bridge network reads zero, the only current flow in the instrument is in the starved amplifiers composed to FET 35 and the transistor 51. When a voltage is applied to the voltmeter circuit via the input probe 11, the voltage is amplified by the starved amplifiers and applied to the emitter follower pair. The emitter follower pair converts the amplified voltage to current in order to drive the diode meter bridge. In a typical circuit constructed according to the invention, the instrument draws more than 10 microamps only during measurement.

In FIG. 2, the two diode meter bridge network 58 of FIG. 1 is replaced by a more efficient four diode bridge network 58'. The output of the emitter follower pair 101 is connected via the bridge 58' in a feedback loop to a wiper of a variable resistor 105 connecting the source electrode of the FET 35 to ground. The variable resistor 105 serves as a means for adjusting the gain of the amplifier stages comprising the FET 35 and the transistor 51 by limiting the amount of feedback from the bridge 58'. The modified bridge network is represented as a diamond-shaped circuit having suitably poled diodes 106, 107, 108, and 109 located in respective sides of the diamond. Diode pairs on opposite sides of the circuit, that is, diodes 106 and 109 and diodes 107 and 108, are arranged for conduction in the same direction. The output of the emitter follower pair 101 is connected to one vertex of the bridge 58' between the diodes 106 and 107. The output of the bridge 58' for feedback to the FET 35 is taken from the opposite vertex of the bridge between the diodes 108 and 109. The meter 61 is connected across the remaining two vertices of the diamond-shaped circuit. When a positive signal is applied to the bridge 58', conduction occurs through the diode 106, the meter 61, and the diode 109. When a negative signal is applied to the bridge, conduction occurs through the alternate path via the diode 108, the meter 61, and the diode 107. In either case, the current flowing through the meter 61 is in the same direction causing unidirectional deflection of the meter pointer 62.

For determining the polarity of a DC signal applied to the bridge 58', the counterparts of the switches 69 and 70 in the circuit of FIG. 1 are formed by the switches 110, 111, 112, and 113 respectively connected in shunt across the diodes 106 through 109. The switches 110 through 113 are ganged in two pairs corresponding to the two alternate conduction paths associated with different polarities. A pair of push buttons 114 and 115, normally located on the housing of the instrument, are mechanically connected to respective pairs of the switches 110–113. Specifically, the button 114, marked positive, is mechanically connected to close the switches 110 and 113 when depressed. If the signal applied to the bridge 58' is positive, depressing the button 114 causes no resultant change in the meter deflection since the diodes 106 and 109 were already fully conductive. Likewise, the button 115, marked negative, is mechanically connected to close the switches 111 and 112 simultaneously when the button 115 is depressed. Similarly, when a negative signal is applied to the bridge, depressing the button 115 causes no resultant change in the meter deflection since the diodes 107 and 108 are already conductive. If the button depressed does not correspond to the polarity of the applied signal, the meter deflection will fall off scale in a manner similar to that described in connection with the bridge 58 of FIG. 1.

The four diode bridge 58' of FIG. 2 has an advantage over the bridge 58 of FIG. 1 in that the voltage across the meter in the bridge 58' is double that produced by the bridge 58 of FIG. 1. In addition, the reverse voltage across each diode in the non-conducting path is less. Thus, diodes with a lower reverse breakdown voltage can be utilized.

Figure 3:
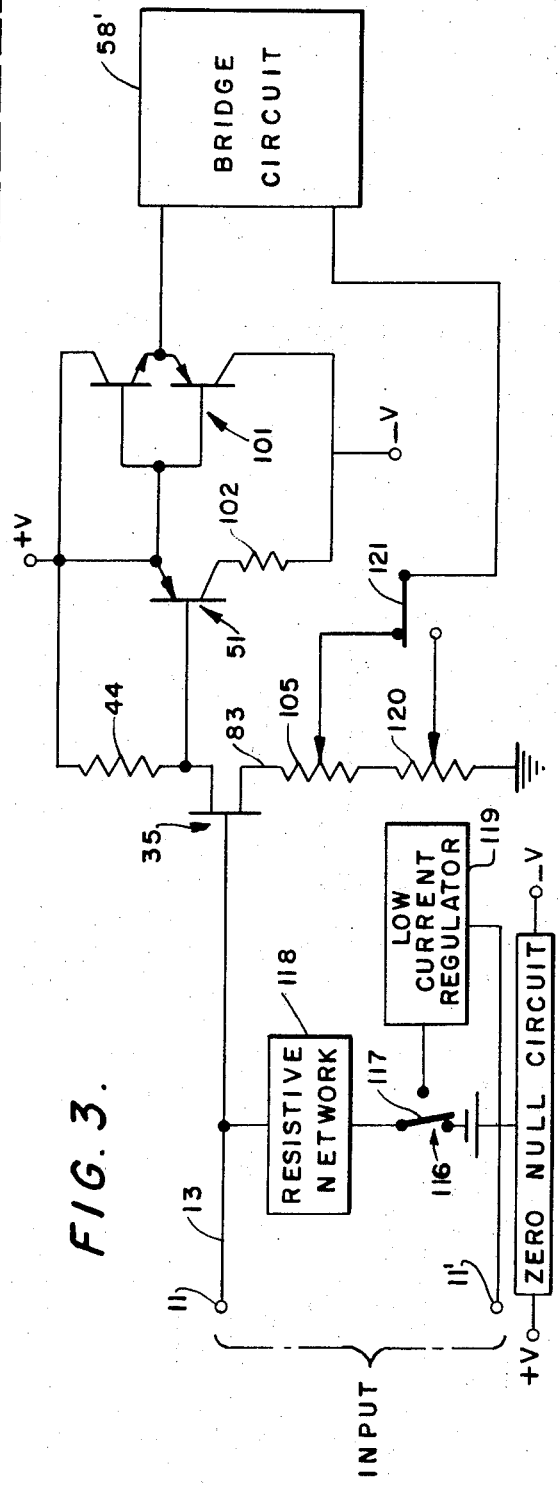
FIG. 3 is a circuit diagram, partially in block form, illustrating the circuit of still another embodiment according to the invention for making resistance measurements at two different power levels.

In FIG. 3, a simplified schematic circuit of FIG. 2 is shown in modified form for use in making resistance measurements. Corresponding circuit elements in FIG. 3 are marked with the same reference numerals used in FIGS. 1 and 2. Measuring the resistance of an element requires passing current through the element to gauge the impedance offered thereby. This requires an active measurement as opposed to passive measurements wherein the circuit elements themselves provide the input signals to the test instrument. In FIG. 3, the voltage applied to the gate of the FET 35 will vary in accordance with the voltage developed across the resistive element being tested. A battery 116 or other source of voltage is connected via a switch 117 and a resistive network 118 across the two probes 11 and 11' which are to be connected at opposite ends of the resistive element under test. When measurements are being made on an element which is connected in circuit with solid state circuitry, the voltage produced by the battery 116 may be sufficient to bias or turn on semiconductor junctions in the circuit under test. For this reason, an alternate voltage source is provided in the form of a low current regulator 119, which may comprise a conventional battery operated power supply. The low current regulator power supply 119 is connected in circuit with the resistive network 118 by means of the switch 117. When the switch 117 is thrown to the alternate position, therefore, low power resistance measurements can be made whereby biasing of semiconductor junctions in the circuit under test is avoided so that the resistance measurement produced by the bridge circuit 58' reflects only the resistance supported by the element which is being tested. The resistive network 118 comprises a network of interchangeable resistances providing measurements in various ranges of resistance in the conventional manner. In a circuit constructed according to the invention, the low current regulator was driven by a 1.5 volt battery source and generated a 70 millivolt output, well below the value necessary to cause biasing of both semiconductor junctions.

In order to handle the reduced input voltage to the FET 35 when the low current regulator 119 is employed, the gain of the amplifier circuitry is automatically changed to a different value. Another variable resistor 120 is connected in series with a variable resistor 105 in the source circuit of the FET 35. A switch 121 is placed in the feedback circuit between the bridge network 58' and the FET 35 to disconnect the feedback loop from the variable resistor 105 and connected to the wiper of the resistor 120. Because the resistor 120 is between the resistor 105 and ground, the amount of feedback from the bridge circuit 58' is reduced, thus increasing the gain of the amplifier circuitry. The values of the resistances 105 and 120 are determined so that equivalent meter deflection will be obtained whether the battery 116 or the regulator 119 is employed. The switches 117 and 121 may be ganged together for simultaneous operation by means of an external switch.

The micropower autopolarity circuit described in connection with FIG. 2 serves to reduce the current drain of the instrument in the on condition when a measurement is not being made to a minimal level. This arrangement permits the instrument to operate continuously for a time nearly equal to the shelf life of the battery power source. In addition, the provision of interchangeable power sources for use in the resistive measurement mode makes the test instrument extremely attractive for in-circuit measurements of resistance without affecting semiconductor junctions connected in circuit with the element whose resistance is being measured.

It should be noted that the 4-diode bridge 58' may be substituted for the 2-diode bridge 58 of FIG. 1 if desired. Moreover, the low power resistance measurement circuit including the interchangeable battery 116 and the low current regulator 119 may be used in connection with the circuit of FIG. 1 in a similar manner.

These additional capabilities for the circuit of the invention provide still additional savings of time for the user and significant convenient advantages. Thus, a versatile, easy-to-use circuit for an electrical instrument and the method of using such circuit has been described.

The invention has been described in detail sufficient to enable one of ordinary skill and expertise in the art to make and use the same. Obviously, modifications and alterations of the preferred embodiment will occur to others upon a reading and understanding of the specification; and, it is my intention to include all such modifications and alterations as part of the invention insofar as they come within the scope of the appended claims.

What is claimed is:

1. A high input impedance circuit for a battery-operated electrical instrument capable of receiving an input signal which is either positive or negative with respect to a datum signal level and providing a unidirectional physical representation thereof for either polarity comprising:

input means for receiving said input signal indicative of a sensed parameter to be measured;
  starved amplifying means for amplifying said input signal to provide an output signal which is a representation of said sensed parameter, said starved amplifying means operating in a starved mode and being biased by a battery which is continuously applied to said starved amplifying means even in the absence of an input signal and wherein the life of said battery is about the same as the shelf life of said battery because of the substantially low current drawn by said starved amplifying means under said conditions;

impedance conversion means operatively connected to said starved amplifying means for effectively electrically connecting the starved amplifying means to a load, said impedance conversion means drawing substantially no effective current from said battery in the absence of an applied input signal;

output means constituting said load and comprising a meter which includes rectifier means having rectifier elements for providing said unidirectional physical representation of the magnitude of a signal applied to said meter irrespective of the polarity of the applied signal, for receiving said output signal from said impedance conversion means and applying said output signal to said meter in such a manner that said physical representation is unidirectional with respect to a datum signal level for output signals which are either unidirectional or bidirectional or a combination thereof with respect to a second datum signal level; and, means selectively shunting the rectifier elements enabling said meter to indicate whether said input signal is positive or negative with respect to said datum signal level by altering the magnitude of the physical representation on said meter.

2. The circuit as defined in claim 1 wherein said input means includes a device for sensing a parameter to be measured and providing an output signal indicative thereof.

3. The circuit as defined in claim 1 wherein said output means includes a first unidirectionally conductive device and a second unidirectionally conductive device, each of which is connected in circuit with said amplifying means for receiving said output signal and in circuit with said meter.

4. The circuit as defined in claim 3 wherein each of said unidirectionally conductive devices is a diode arranged so that one of said diodes conducts for an output signal having a first polarity and the other of said diodes conducts for an output signal having a second polarity.

5. The circuit as defined in claim 4 wherein said indicating means includes a first switch in circuit with said one diode and a second switch in circuit with said other diode for selectively shunting the output signal from said impedance conversion means across the diode whereby closure of one of said first switch and said second switch without changing the representation on said meter indicates that said input signal is positive and the closure of the other switch indicates that said input signal is negative by changing the representation on said meter.

6. The circuit as defined in claim 5 wherein said output means further includes a balance resistor in circuit with each of said diodes.

7. The circuit as defined in claim 6 wherein the output means further includes means for selecting one of a plurality of resistances, each of which corresponds to a sensing function to be performed by the circuit.

8. The circuit as defined in claim 7 further including a low current regulator and a low current switch means for placing said low current regulator in circuit with said plurality of resistances for measuring the resistance of a test circuit at a low current draw.

9. The circuit as defined in claim 1 further including feedback means in circuit with said output means and said starved amplifying means.

10. The circuit as defined in claim 9 wherein said feedback means includes selectively variable resistance means and feedback amplifier means in circuit therewith, said variable resistance means being in circuit with said output means and said feedback amplifier means is in circuit with said variable resistance means and said starved amplifying means.

11. The circuit as defined in claim 10 further including a low current regulator and a low current switch means for placing said low current regulator in circuit with said output means for measuring the resistance of a test circuit at a low current draw and wherein said selectively variable switch means is operative in cooperation with said low current regulator.

12. The circuit as defined in claim 1 further including means for varying the said physical representation of said meter so that said physical representation is set at a predetermined position for a predetermined condition.

13. The circuit as defined in claim 12 wherein said predetermined condition is the absence of an input signal to the circuit and said predetermined position is a null reading on said meter.

14. The circuit as defined in claim 12 wherein said predetermined condition is the absence of an input signal to the circuit and said predetermined position is a predetermined reading on said meter.

15. The circuit as defined in claim 12 wherein said predetermined condition is the presence of a first input signal to the circuit and said predetermined condition is a null reading on said meter.

16. The circuit as defined in claim 1 wherein said starved amplifying means includes a pair of operatively connected transistors operated in a starved mode condition.

17. The circuit as defined in claim 16 wherein said impedance conversion means includes a pair of complementary transistors each having its emitter connected to said output means and its base connected to the output of one of said pair of said transistors operating in said starved mode.

18. The circuit as defined in claim 17 wherein said output means includes four diodes connected so that the anode of a first diode is connected to the cathode of a second diode and the anode of a third diode is connected to the cathode of a fourth diode, the cathode of the first diode being connected to the cathode of the third diode, and the anode of the second diode being connected to the anode of the fourth diode, said indicator being connected between the common cathode and common anode connections.

19. The circuit as defined in claim 18 further including a switch in circuit with each of said diodes.

20. In a circuit for an electrical instrument of the multimeter type which is capable of at least receiving an input signal which is either positive or negative with respect to a datum signal level and providing a unidirectional physical representation of the magnitude of said input signal and which includes a source of input signals, and a meter which includes an indicator, the improvement comprising autopolarity means for causing said indicator to read upscale for output signals having either positive or negative components or a combination thereof, said means comprising a bridge network which includes four diodes connected so that the anode of a first diode is connected to the cathode of a second diode and the anode of a third diode is connected to the cathode of a fourth diode, the cathode of the first diode being connected to the cathode of the third diode, and the anode of the second diode being connected to the anode of the fourth diode, said indicator means being connected between the common cathode and common anode connection, said autopolarity means including means selectively shunting the diodes enabling said indicator to indicate whether said input signal is positive or negative with respect to said datum signal level by altering the magnitude of the physical representation on said meter.

21. The circuit as defined in claim 20 further including a switch in circuit with each of said diodes.

22. The circuit as set forth in claim 20 wherein the closure of a pair of the switches in circuit with said diodes provides an indication of one polarity of said input signal and the closure of another pair of the switches in circuit with said diodes provide an indication of the other polarity of said input signal.

23. The circuit as set forth in claim 22 wherein said pair of switches is actuated by a first push button switch on said instrument and said another pair of switches is actuated by a second push button on said instrument, the undepressed or depressed state of both of said first push button and said second push button indicating the autopolarity mode.

* * * * *